(12) United States Patent
Brocheton et al.

(10) Patent No.: US 10,364,175 B2
(45) Date of Patent: Jul. 30, 2019

(54) METHODS FOR PRODUCING SHAPED GLASS ARTICLES

(71) Applicant: CORNING INCORPORATED, Corning, NY (US)

(72) Inventors: Yves Andre Henri Brocheton, Samoreau (FR); Thierry Luc Alain Dannoux, Avon (FR); Michel Prassas, Fontainebleau (FR)

(73) Assignee: CORNING INCORPORATED, Corning, NY (US)

( * ) Notice: Subject to any disclaimer, the term of this patent is extended or adjusted under 35 U.S.C. 154(b) by 73 days.

(21) Appl. No.: 15/513,708

(22) PCT Filed: Nov. 28, 2014

(86) PCT No.: PCT/IB2014/002959
§ 371 (c)(1),
(2) Date: Mar. 23, 2017

(87) PCT Pub. No.: WO2016/083862
PCT Pub. Date: Jun. 2, 2016

(65) Prior Publication Data
US 2017/0291843 A1     Oct. 12, 2017

(51) Int. Cl.
*C03C 8/24*     (2006.01)
*C03B 23/03*     (2006.01)
(Continued)

(52) U.S. Cl.
CPC ............ *C03B 23/03* (2013.01); *C03B 23/025* (2013.01); *C03C 3/064* (2013.01); *C03C 8/24* (2013.01); *C03C 2218/328* (2013.01)

(58) Field of Classification Search
CPC .............................................. C03C 2218/328
See application file for complete search history.

(56) References Cited

U.S. PATENT DOCUMENTS 3,737,294 A     6/1973   Dumbaugh
3,746,526 A     7/1973   Giffon
(Continued)

FOREIGN PATENT DOCUMENTS

CN          101429405 B       5/2015
JP          60033221          2/1985
(Continued)

OTHER PUBLICATIONS

International Search Report and Written Opinion of the International Searching Authority; PCT/IB2014/002959; dated Nov. 28, 2014; 11Pages; European Patent Office.
(Continued)

*Primary Examiner* — Lisa L Herring (57) ABSTRACT

A method for producing a shaped glass article may include heating at least a portion of a mold-facing surface of the glass article to a forming temperature, shaping the glass article in a mold, and removing the multi-layer coating from the glass article. The glass article may be coated with a multi-layer removable coating including an inner layer in contact with the glass article and an outer layer disposed over the inner layer. The mold may be in direct contact with the outer layer during shaping. The inner layer may include a first glass having a softening point of at least about 50° C. less than a softening point of the glass article. The outer layer may include a second glass having a softening point of at least about 50° C. greater than the softening point of the glass article.

22 Claims, 4 Drawing Sheets

(51) Int. Cl.
*C03C 3/064* (2006.01)
*C03B 23/025* (2006.01)

(56) References Cited

U.S. PATENT DOCUMENTS

| | | | |
|---|---|---|---|
| 3,849,097 | A | 11/1974 | Giffen |
| 3,899,315 | A | 8/1975 | Siegmund |
| 3,931,438 | A | 1/1976 | Beall |
| 4,102,664 | A | 7/1978 | Dumbaugh, Jr. |
| 4,214,886 | A | 7/1980 | Shay et al. |
| 4,381,932 | A | 5/1983 | Olson |
| 4,457,771 | A | 7/1984 | Ambrogi |
| 4,735,855 | A | 4/1988 | Wofford |
| 4,880,453 | A | 11/1989 | Coppola et al. |
| 5,100,452 | A | 3/1992 | Dumbaugh, Jr. |
| 5,342,426 | A | 8/1994 | Dumbaugh |
| 5,559,060 | A | 9/1996 | Dumbaugh |
| 5,725,956 | A | 3/1998 | McCurdy et al. |
| 7,201,965 | B2 | 1/2007 | Gulati |
| 7,514,149 | B2 | 4/2009 | Bocko et al. |
| 8,007,913 | B2 | 8/2011 | Coppola |
| 8,316,668 | B1* | 11/2012 | Chan ................ C03B 25/02 65/114 |
| 8,573,005 | B2 | 11/2013 | Dannoux et al. |
| 2007/0190340 | A1 | 8/2007 | Coppola et al. |
| 2012/0015195 | A1 | 1/2012 | Wang et al. |
| 2014/0013804 | A1* | 1/2014 | Ono ................ C03C 23/0025 65/43 |
| 2014/0065374 | A1 | 3/2014 | Tsuchiya |
| 2014/0154292 | A1* | 6/2014 | Borrelli ................ C03C 3/085 424/400 |
| 2017/0073266 | A1 | 3/2017 | Amosov et al. |
| 2017/0121209 | A1 | 5/2017 | Dannoux et al. |

FOREIGN PATENT DOCUMENTS

| | | |
|---|---|---|
| JP | 11256129 A | 9/1999 |
| JP | 2000154042 A | 6/2000 |
| JP | 2003082299 A | 3/2003 |
| KR | 2009085727 A | 8/2009 |
| KR | 2010134096 A | 12/2010 |
| KR | 201110081 U | 10/2011 |
| WO | 2014015840 | 1/2014 |

OTHER PUBLICATIONS

English Translation of CN201480084591.3 Office Action dated Apr. 3, 2019; 10 Pages; Chinese Patent Office.

* cited by examiner

METHODS FOR PRODUCING SHAPED GLASS ARTICLES

This application claims the benefit of priority under 35 U.S.C. § 371 of International Application No. PCT/IB2014/002959 filed Nov. 28, 2014, the content of which is incorporated herein by reference in its entirety.

BACKGROUND

Field

The present specification generally relates to methods for shaping glass articles and, more specifically, to methods for shaping 3D glass articles without damaging the surface of the glass article.

Technical Background

Glass articles can be formed into 3D shapes by heating the glass to a visco-elastic state and contacting the glass with a mold. Such 3D shapes may be utilized as cover glass for portable electronic devices such as smart phones and tablets. However, forming three-dimensionally shaped glass articles can be challenging. For example, some glass compositions, such as alkali aluminosilicate glass compositions, have high softening points (sometimes greater than 800° C.), which makes a precision molding process more difficult since the glass needs to be heated to higher temperatures in order to reach a visco-elastic state suitable to forming. Also, molding at high temperatures can cause deformation of the surface of the glass article that is shaped. For example, direct contact between the mold and the contacting surface of the glass article may cause abnormalities in the surface of the glass such as visual defects, as well as other surface abnormalities that, while not detectable by the human eye, may contribute to glass fractures or even failure by cracking.

SUMMARY

According to one embodiment, a method for producing a shaped glass article may include heating at least a portion of a mold-facing surface of the glass article to a forming temperature, shaping the glass article in a mold, and removing the multi-layer coating from the glass article. The forming temperature may be within about 100° C. of the softening point of the glass article. The glass article may be coated with a multi-layer removable coating comprising an inner layer in contact with the glass article and an outer layer disposed over the inner layer. The mold may be in direct contact with the outer layer during shaping. The inner layer may comprise a first glass having a viscosity from about $10^4$ P to about $10^{7.5}$ P at the forming temperature. The outer layer may comprise a second glass having a viscosity from about $10^{7.8}$ P to about $10^{14}$ P at the forming temperature.

In another embodiment, a method for producing a shaped glass article may include heating at least a portion of a mold-facing surface of the glass article to a forming temperature, shaping the glass article in a mold, and removing the multi-layer coating from the glass article. The forming temperature may be within about 100° C. of the softening point of the glass article. The glass article may be coated with a multi-layer removable coating comprising an inner layer in contact with the glass article and an outer layer disposed over the inner layer. The mold may be in direct contact with the outer layer during shaping. The inner layer may comprise a first glass having a softening point of at least about 50° C. less than a softening point of the glass article. The outer layer may comprise a second glass having a softening point about equal to or greater than the softening point of the glass article.

In yet another embodiment, a coated glass article may comprise a glass article and a multi-layer removable coating. The glass article may comprise a first surface and a second surface opposite the first surface. The multi-layer removable coating may comprise an inner layer in contact with the glass article and an outer layer disposed over the inner layer. The inner layer may comprise a first glass having a softening point of at least about 50° C. less than a softening point of the glass article. The outer layer may comprise a second glass having a softening about point about equal to or greater than the softening point of the glass article.

Additional features and advantages of the methods for producing shaped glass articles will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of methods for producing shaped glass articles, examples of which are illustrated in the accompanying drawings. Whenever possible, the same reference numerals will be used throughout the drawings to refer to the same or like parts. In one embodiment, a glass article with a removable multi-layer coating may be shaped by a process which includes the steps of contacting a glass article coated with the removable multi-layer coating with a mold at elevated temperatures, where the mold directly contacts the removable multi-layer coating, and removing the multi-layer coating from the glass article to produce a shaped glass article. The multi-layer coating generally comprises an inner layer that is in contact with the glass article, and an outer layer which is disposed over the inner layer. The inner layer generally comprises a glass having a composition that has a relatively low softening point as compared with the softening point of the glass article being shaped (sometimes referred to herein as a "soft" glass), and the outer layer comprises a glass having a composition that has a relatively high softening point as compared with the softening point of the glass article being shaped (sometimes referred to herein as a "hard" glass). As such, when the coated glass article is placed into contact with a mold and is shaped, the inner layer is softened and does not cause damage to the surface of the glass article. Meanwhile, the outer layer prevents sticking between the mold and the inner layer. For example, if the outer layer is not applied over the inner layer, the inner layer may stick to the mold, especially when relatively high forming temperatures are used (i.e., over about 600° C.) to shaped the glass article. As used herein, the forming temperature refers to the temperature of at least a portion of the glass article and multi-layer coating while being shaped in the mold. It may be difficult to remove glass that sticks to the mold surface so that the mold may be reused to shape another glass article. Embodiments of methods for producing shaped glass articles and apparatuses for doing the same will be described in more detail herein with specific reference to the appended drawings.

Figure 1:
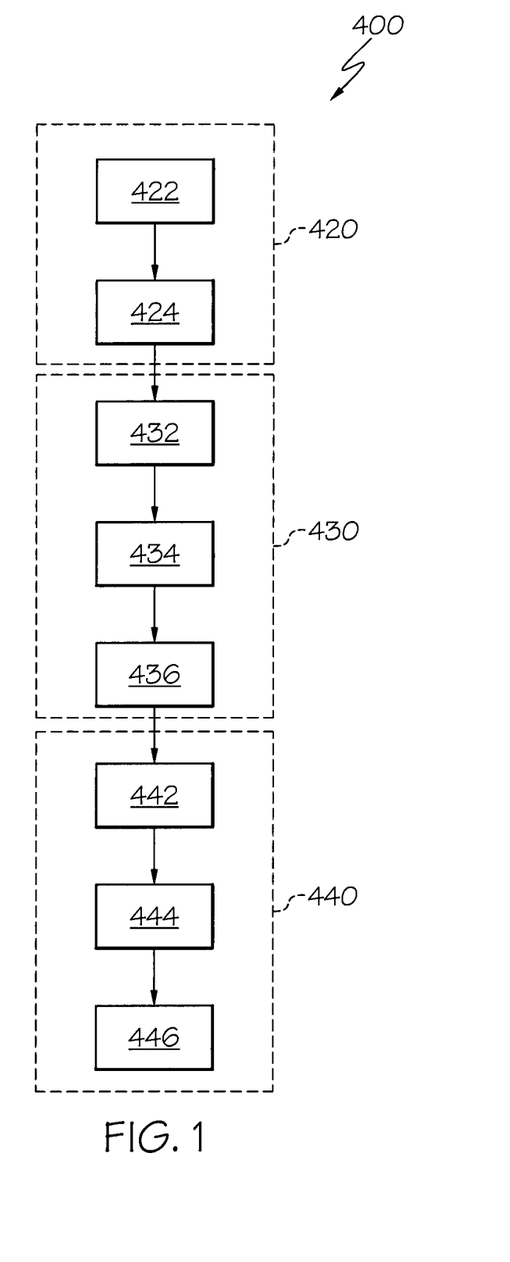
FIG. 1 is a flow diagram of a method for producing shaped glass articles, according to one or more embodiments shown and described herein.
Figure 2:
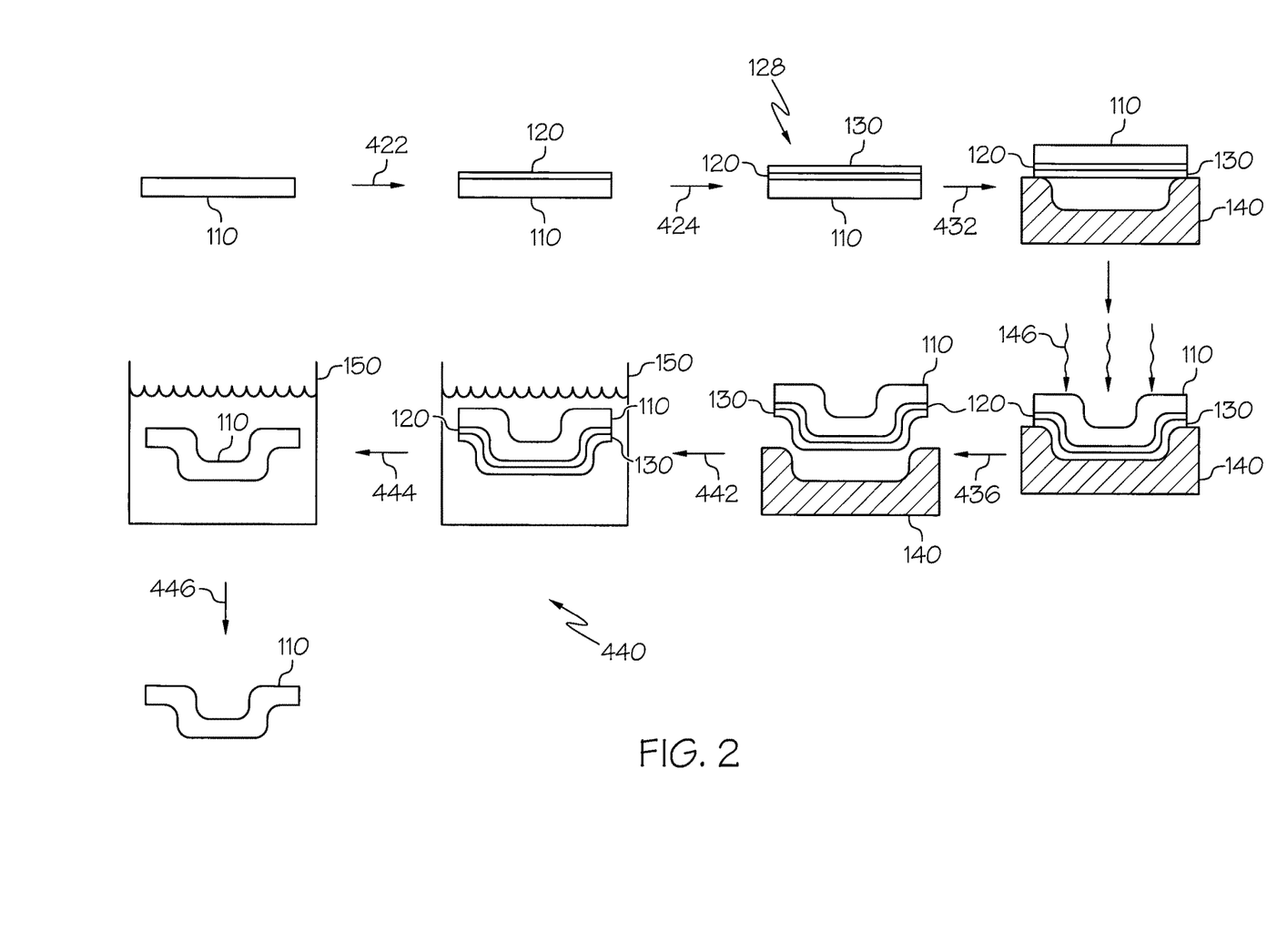
FIG. 2 schematically depicts the method steps of the flow diagram of FIG. 1, according to one or more embodiments shown and described herein.

Generally, FIG. 1 shows the steps in a method 400 for producing shaped glass articles. FIG. 2 schematically depicts the steps shown in FIG. 1 with like numbers. FIG. 2 generally shows the starting material of a 2D glass article 110 which is shaped into a 3D glass article 110. For example, the glass article 110 initially may have a 2D geometry, such as a glass sheet, and be shaped into a 3D geometry. The glass article 110 generally may comprise any glass composition suitable for 3D forming. Additionally, or alternatively, the glass article 110 may comprise a ceramic material and/or a glass-ceramic material. In some embodiments, the glass may be ion-exchangeable aluminosilicate glass. Examples of such ion-exchangeable aluminosilicate glass include, but are not limited to, Gorilla® Glass (commercially available from Corning, Inc.). Such glass, especially after 3D molding, may be well suited for many uses, such as, for example, as cover glass for hand-held consumer electronic devices. In one embodiment, the glass article 110 may be formed from Corning code 2318 Gorilla glass. In embodiments, the glass article 110 may consist of, for example, a phosphosilicate glass composition, a borosilicate glass composition, or an aluminosilicate glass composition.

In one embodiment, the composition of the glass article 110 may have a softening point of at least about 700° C. The phrase "softening point," as used herein, refers to the temperature at which a glass composition has a viscosity of about $1 \times 10^{7.6}$ Poise (P). Generally, the softening point is the temperature at which a small diameter fiber of the glass will elongate under its own weight. As the glass is heated to the softening point, the glass becomes more workable and may be molded into a 3D shape when contacted by a mold 140. The softening point of a glass may be determined under ASTM C338-93. In other embodiments, the glass article 110 may have a softening point of at least about 710° C., at least about 720° C., at least about 730° C., at least about 740° C., at least about 750° C., at least about 760° C., at least about 770° C., at least about 780° C., at least about 790° C., at least about 800° C., at least about 810° C., at least about 820° C., at least about 830° C., at least about 840° C., or even at least about 850° C. In other embodiments, the glass article 110 may have a softening point from about 700° C. to about 900° C., from about 700° C. to about 850° C., from about 775° C. to about 900° C., from about 800° C. to about 900° C., from about 800° C. to about 875° C., from about 810° C. to about 850° C., from about 820° C. to about 840° C., or from about 825° C. to about 835° C. For example, sodalime glass may have a softening point of about 720° C. to about 730° C. and Gorilla® Glass may have a softening point of about 830° C.

Figure 3:
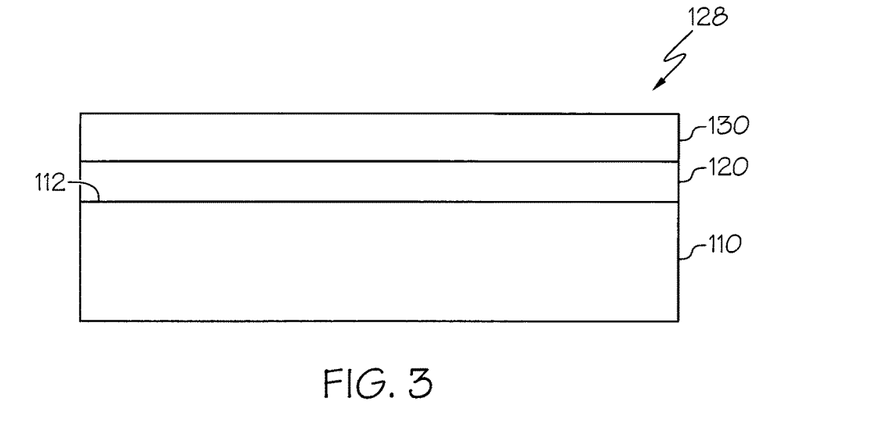
FIG. 3 schematically depicts a cross-sectional diagram of a multi-layer coating on a glass article, according to one or more embodiments shown and described herein.

In step 420, the glass article 110 is coated with the inner layer 120 and outer layer 130. In some embodiments, step 420 can be divided into the two sub-steps of step 422 and step 424. In step 422 the inner layer 120 is applied to the glass article 110, and in step 424 the outer layer 130 is applied over the inner layer 120. FIG. 3 shows a schematic cross sectional view of a glass article 110 with the inner layer 120 and outer layer 130 applied thereto. The inner layer 120 and the outer layer 130 together form the multi-layer removable coating 128. In one embodiment, the inner layer 120 is disposed directly on a surface 112 of the glass article 110, and the outer layer 130 is disposed over of the inner layer 120 with the inner layer 120 sandwiched between the outer layer and the glass article. The inner layer 120 and the outer layer 130 may be in direct contact with one another. Generally, the multi-layer removable coating 128 is deposited onto the surface 112 of the glass article 110 which will face the mold 140 during 3D forming. As such, surface 112 of the glass article 110 is the mold-facing surface of the glass article 110 that is positioned closest to the mold 140 while the glass article 110 is shaped. While in one embodiment only one surface 112 of the glass article 110 is coated with the multi-layer removable coating 128, in other embodiments, substantially the entire glass article 110 may be coated (such as both opposing surfaces of a glass sheet).

The inner layer 120 and/or outer layer 130 may be a mixture comprising glass, such as, but not limited to, glass frit, and a binder material. In some embodiments, the inner layer 120 and/or the outer layer 130 may be a mixture consisting essentially of glass and binder material. For example, the combination of the glass frit and binder material may make up at least about 99% of the mixture. In one embodiment, glass frit and binder is mixed in a weight ratio of about 1:1, while in other embodiments, the glass frit and binder weight ratio may be about 1:2, 1:1.5, 1.5:1, 2:1, or any range therebetween. This mixture may have a paste texture, and may be formed from relative amounts of the binder material and glass frit to form a paste of acceptable viscosity for the chosen application method. The glass frit/binder material mixtures may be applied by a wide variety of application techniques, such as, but not limited to, doctor blade application, dipping, printing, spraying, or another suitable mechanical deposition process. Generally, the inner layer 120 is applied directly to the glass article 110, and then the outer layer 130 may be applied over the inner layer 120. The glass of the inner layer 120 or outer layer 130 may be glass frit comprising glass particles sized from about 1 micron to about 20 microns. The binder material of the inner layer 120 and/or the outer layer 130 may be any suitable binder, such as an organic binder (i.e., pine oil or polyvinyl alcohol) that can form a matrix between glass particles. For example, one suitable binder material is MX54, commercially available from Ferro Corp. of Mayfield Heights, Ohio, USA.

Generally, the inner layer 120 and outer layer 130 comprise glasses with different glass compositions which have different softening points. The glass of the inner layer 120 has a lower softening point than the glass of the outer layer 130. When the glass article 110 and multi-layered removable coating 128 are elevated in temperature to the forming temperature, the glass of the inner layer 120 has a lower viscosity than the glass of the outer layer 130. In the processes described herein, the forming temperature used may depend upon the glass composition of the glass article 110. In embodiments, the forming temperature may be less than the softening point of the glass article 110. For example, the forming temperature may be less than and within 100° C., 90° C., 80° C., 70° C., 60° C., 50° C., 40° C., 30° C., 20° C., or even 10° C. of the softening point of the glass article 110. For example, the forming temperature may be from about 10° C. to about 70° C. less than the softening point of the glass article 110. The viscosity of the glass article 110 at the forming temperature may be from about $10^{7.8}$ P to $10^9$ P.

In one embodiment, the viscosity of the glass composition of the inner layer 120 at the forming temperature is from about $10^4$ P to about $10^{7.5}$ P, such as, for example, from about $10^4$ P to about $10^{6.5}$ P, from about $10^4$ P to about $10^6$ P, or from about $10^4$ P to about $10^{5.5}$ P. In other embodiments, the glass compositions contemplated for use in the inner layer 120 include, but are not limited to, baryum borate glass compositions. The glass of the inner layer 120 may be chosen based on the composition of the glass article 110. For example, glass compositions disclosed in U.S. Pat. No. 4,880,453 may be suitable for the glass of the inner layer 120. However, it should be understood that a wide variety of glass compositions may be used in the inner layer 120, such that the viscosity of the inner layer 120 is sufficiently fluid to soften and protect the surface 112 of the glass article 110 at the forming temperature. In one embodiment, the glass of the inner layer 120 may be sufficiently stable such as to not devitrify at the forming temperature. In another embodiment, the glass of the inner layer 120 may have solubility in a particular chosen solvent of at least about 100 times greater than that of the glass article 110.

In one embodiment, the viscosity of the glass composition of the outer layer 130 at the forming temperature is from about $10^{7.8}$ P to about $10^{14}$ P, such as, for example, from about $10^8$ P to about $10^{14}$ P, from about $10^{8.5}$ P to about $10^{14}$ P, from about $10^9$ P to about $10^{14}$ P or from about $10^{10}$ P to about $10^{14}$ P. In other embodiments, the glass compositions contemplated for use in the outer layer 130 include, but are not limited to, alkali/alkaline earth borate or phosphate glass compositions, aluminosilicate compositions, and sodalime glass compositions. However, it should be understood that a wide variety of glass compositions may be used in the outer layer 130, such that the viscosity of the outer layer 130 is sufficiently viscous to not stick to the mold 140 at the forming temperature. In some embodiments, the composition of the glass in the outer layer 130 may be identical to the composition of the glass of the glass article 110.

Generally, the softening point of the glass of the inner layer 120 is less than the softening point of the glass of the outer layer 130, and the softening point of the glass article 110 is between the softening point of the glass of the inner layer 120 and the glass of the outer layer 130. The glass compositions of the inner layer 120 and the outer layer 130 may be based on the composition and softening point of the glass article 110 that is shaped. For example, in some embodiments, the softening point of the glass of the inner layer 120 may be at least about 100° C. less than the softening point of the glass of the outer layer 130. In other embodiments, the softening point of the glass of the inner layer 120 may be at least about 125° C. less than the softening point of the glass of the outer layer 130, or the softening point of the glass of the inner layer 120 may be at least about 150° C. less than the softening point of the glass of the outer layer 130. In some embodiments, the softening point of the glass of the inner layer 120 may be from about 100° C. to about 400° C., from about 150° C. to about 400° C., from about 200° C. to about 400° C., from about 250° C. to about 400° C., from about 100° C. to about 350° C., from about 100° C. to about 300° C., or from about 100° C. to about 250° C. less than the softening point of the glass of the outer layer 130.

In some embodiment, the glass of the inner layer 120 may have a softening point of at least about 50° C. less than the softening point of the glass article 110. For example, the glass of the inner layer 120 may have a softening point of at least about 50° C. less than the softening point of the glass article 110, the glass of the inner layer 120 may have a softening point of at least about 75° C. less than the softening point of the glass article 110, the glass of the inner layer 120 may have a softening point of at least about 100° C. less than the softening point of the glass article 110, the glass of the inner layer 120 may have a softening point of at least about 125° C. less than the softening point of the glass article 110, the glass of the inner layer 120 may have a softening point of at least about 150° C. less than the softening point of the glass article 110, the glass of the inner layer 120 may have a softening point of at least about 150° C. less than the softening point of the glass article 110, the glass of the inner layer 120 may have a softening point of at least about 175° C. less than the softening point of the glass article 110, or the glass of the inner layer 120 may have a softening point of at least about 200° C. less than the softening point of the glass article 110.

In other embodiments, the glass of the inner layer 120 may have a softening point from about 50° C. to about 400° C. less than the softening point of the glass article 110. For example, the glass of the inner layer 120 may have a softening point from about 75° C. to about 350° C. less than the softening point of the glass article 110, the glass of the inner layer 120 may have a softening point from about 100° C. to about 300° C. less than the softening point of the glass article 110, or the glass of the inner layer 120 may have a softening point from about 100° C. to about 200° C. less than the softening point of the glass article 110.

In some embodiments, the glass of the outer layer 130 may have a softening point about equal to or greater than that softening point of the glass article 110. For example, the glass of the outer layer 130 may have a softening point about equal to the softening point of the glass article (i.e., if the glass article 110 and glass of the outer layer 130 have the same or similar composition), the glass of the outer layer 130 may have a softening point of at least about 25° C. greater than the softening point of the glass article 110, the glass of the outer layer 130 may have a softening point of at least about 50° C. greater than the softening point of the glass article 110, the glass of the outer layer 130 may have a softening point of at least about 75° C. greater than the softening point of the glass article 110, the glass of the outer layer 130 may have a softening point of at least about 100° C. greater than the softening point of the glass article 110, the glass of the outer layer 130 may have a softening point of at least about 125° C. greater than the softening point of the glass article 110, the glass of the outer layer 130 may have a softening point of at least about 150° C. greater than the softening point of the glass article 110, the glass of the outer layer 130 may have a softening point of at least about 150° C. greater than the softening point of the glass article 110, the glass of the outer layer 130 may have a softening point of at least about 175° C. greater than the softening point of the glass article 110, or the glass of the outer layer 130 may have a softening point of at least about 200° C. greater than the softening point of the glass article 110.

In other embodiments, the glass of the outer layer 130 may have a softening point from about 0° C. to about 400° C. greater than the softening point of the glass article 110. For example, the glass of the outer layer 130 may have a softening point from about 75° C. to about 350° C. greater than the softening point of the glass article 110, the glass of the outer layer 130 may have a softening point from about 100° C. to about 300° C. greater than the softening point of the glass article 110, or the glass of the outer layer 130 may have a softening point from about 100° C. to about 200° C. greater than the softening point of the glass article 110.

For purposes of illustration only, the coating layers shown in FIG. 3 are uniform in thickness and are depicted as completely flat. However, this does not need to be the case in embodiments of the glass article 110 coated with the multi-layer removable coating 128 disclosed herein, as layers may be non-uniform in thickness and/or in shape. Further, while the inner layer 120 and outer layer 130 are illustrated as continuous layers, they may be discontinuous, for example, formed of multiple spaced-apart strips or islands of material. As used herein, the thickness of a layer is the average thickness of the layer over the entire surface area that is coated. In some embodiments, the multi-layer coating 128 (including the inner layer 120 and outer layer 130) may have a thickness from about 10 microns to about 500 microns. In other embodiments, the multi-layer coating 128 may have a thickness from about 25 microns to about 300 microns, from about 50 microns to about 100 microns, from about 55 microns to about 90 microns, from about 60 microns to about 80 microns, or from about 65 microns to about 70 microns.

In some embodiments, the inner layer 120 may have a thickness from about 5 microns to about 150 microns. For example, the inner layer 120 may have a thickness from about 10 microns to about 80 microns, or from about 10 microns to about 50 microns, Additionally, or alternatively, the outer layer 130 may have a thickness from about 5 microns to about 200 microns. For example, the outer layer 130 may have a thickness from about 20 microns to about 100 microns, from about 25 microns to about 75 microns, from about 25 microns to about 60 microns, or from about 30 microns to about 50 microns.

While the multi-layer coating 128 shown in FIG. 3 comprises only two sub-layers, other embodiments are included in this disclosure. For example, the multi-layer coating may comprise any number of coating layers, such as two, three, four, or even more layers, where layers are disposed between the inner layer 120 and the outer layer 130. However, the inner layer 120 generally is a soft layer which will not produce abnormalities in the surface 112 of the glass article 110 during shaping and the outer layer 130 generally is a hard layer which will not stick to the mold 140 during shaping.

In step 430, the glass article 110 (with the applied inner layer 120 and outer layer 130) is shaped with a mold 140. In some embodiments, step 430 can be divided into the three sub-steps: step 432, step 434, and step 436. In step 432, the glass article 110 which has been coated with the inner layer 120 and outer layer 130 is positioned on the mold 140. Generally, the mold-facing surface 112 of the glass article 110 (the surface 112 coated with the multi-layer coating 128) faces the mold 140. As shown in FIG. 2, the glass article 110 is positioned such that the outer layer 130 is in direct contact with the mold 140. This configuration enables the glass article 110 to be shaped by the mold 140 while the outer layer 130 directly contacts the mold 140 and does not stick to the mold 140 upon removal.

Figure 4:
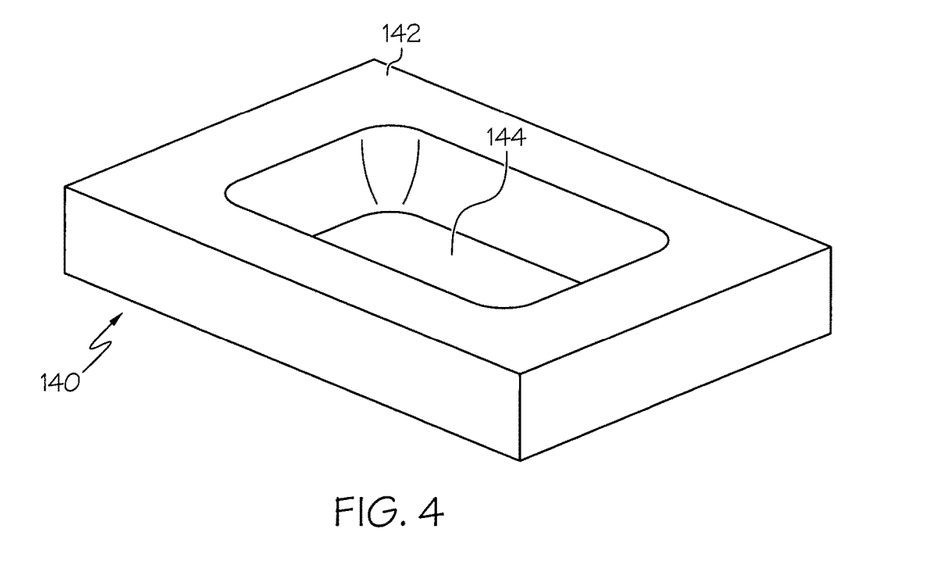
FIG. 4 schematically depicts the structure of a mold for shaping glass, according to one or more embodiments shown and described herein.

Referring to FIG. 4, a mold 140 for glass-shaping is depicted. The mold 140 may comprise a mold body 142 that may include a forming surface 144 disposed on the mold body 142. In the embodiment shown in FIG. 4, the geometry of the forming surface 144 defines a cavity in the mold body 142. However, in other embodiments, the geometry of the forming surface 144 may define other shapes such as protruded areas of the mold body 142 that may make contact with the glass article 110 being shaped. It should be understood that a wide variety of geometries of the mold body 142 may be used to form varying 3D glass articles. In some embodiments, more than one mold body may be utilized to form a glass article 110. For example, two mold bodies may make contact with opposite sides of a glass body to shape the glass body. Accordingly, in a two-mold embodiment, each mold body may comprise a forming surface which makes contact with the multi-layer coating 128. In such a case, multiple surfaces of the glass article 110 may be coated with the multi-layer coating 128.

The mold body 142 may be any suitable mold 140 capable of shaping molten glass. Examples of molds 140 include, but are not limited to, tools such as dies, or other manufacturing presses. The mold body 142 may comprise any metal or other material capable of withstanding high temperatures, such as refractory metals, refractory ceramics, or the like. For example, the mold body 142 may comprise a high temperature alloy with high hardness, such as, but not limited to, nickel-based alloys such as Inconel® 718 or other, similar high temperature alloys. In some embodiments, the mold 140 may contain a coating, such as a refractory nitride coating, which enhances durability of the mold 140.

In step 434, the glass article 110 is shaped by heating the glass article 110 to a forming temperature within about 100° C. of the softening point of the glass article. For example, the glass article 110 may be heated to a temperature of less than and within about 100° C. of the softening point of the glass article 110. The glass article 110 may be heated to a forming temperature not greater than the softening point of the outer layer 130 so that the glass of the outer layer 130 is not fully sintered during glass shaping. It should be understood that in some embodiments only a portion of the glass article 110 is heated to its forming temperature (i.e., the entire glass article 110 need not be heated to its softening point), as only portions of the glass article 110 which are being shaped are heated to such a temperature. For example, in some embodiments, for a touch screen geometry, only the edges and corners of the molded portion are three-dimensionally shaped while the flat middle section may be maintained at a temperature below the softening point of the glass article 110.

The heating may be from any suitable heating source, including, but not limited to radiant heat 146 from above and/or below the mold 140. In other embodiments, the mold 140 is heated such that it conductively heats the glass article 110 upon direct contact between the mold 140 and the coated glass article 110. As the glass article 110 approaches its softening point, it conforms to the shaped of the mold 140.

At a temperature at or above the softening point of the glass article 110, the inner layer 120 is substantially sintered to form a dense layer around the surface 112 of the glass article 110. The inner layer 120 is fully sintered because its softening point is lower than the softening point of the glass article 110. The interface between the inner layer 120 and the glass article 110 is smooth and does not substantially alter the surface 112 of the glass article 110. On the other hand, the outer layer 130 is not fully sintered, and is instead only partially sintered. The outer layer 130 has a porosity greater than that of a fully or nearly fully sintered glass. The outer layer 130 is not fully sintered because its softening point is higher than the temperature at which the glass article 110 is shaped. However, while the outer layer 130 may not be exposed to a temperature high enough to soften it to a workable condition as a bulk material, it is formed into the shape of the mold 140 because it comprises small particles of glass, such as glass frit, such that the bulk shape of the outer layer 130 can be manipulated in shape to contour the mold 140.

In step 436, the glass article 110, now shaped, is separated from the mold 140. Prior to separation from the mold 140, the glass article 110 may be cooled to a temperature below its softening point so that it is relatively rigid and will maintain its shape. As described above, in one embodiment, there is little or no sticking between the mold 140 and the outer layer 130.

Generally, the binder is partially or entirely liberated during the shaping by the relatively high forming temperatures. In some embodiments, the binder may burn off and cause coloration in the inner layer 120 and/or the outer layer 130. Such coloration may allow for reduced radiant heating in order to heat the glass article 110 to an appropriate forming temperature above its softening point due to enhanced radiant heat absorption from the opaque layer.

In step 440, the multi-layer coating 128 (i.e., the inner layer 120 and the outer layer 130) is removed from the shaped glass article 110. In one embodiment, the multi-layer coating 128 is removed from the glass article 110 by contacting the multi-layer coating 128 with a solvent, such as an acid. Generally, step 440 may comprise the sub-steps of step 442, step 444, and step 446. In step 442, the coated glass article 110 is submerged in an acid bath 150. In step 144, the inner layer 120 and outer layer 130 is dissolved from the glass article 110, leaving a shaped glass article 110 which does not have a coating. In step 446, the glass article 110 is removed from the acid bath 150.

The acid may etch the inner layer 120 and the outer layer 130, but does not substantially etch the mold-facing surface 112 of the glass article 110. Any suitable acid may be used for the etching process, such as, for example, HCl or $HNO_3$, and the acid may be selected based on the glass compositions of the glass article 110, the inner layer 120, and the outer layer 130. Without being bound by theory, it is believed that a suitable acid removes the inner layer 120 while not affecting the glass article 110 because the inner layer 120 is a relatively soft glass having a softening point below that of the glass article 110. Generally, soft glasses are more readily etched, while hard glasses are more difficult or impossible to etch with a given acid. Additionally, the outer layer 130 may be removed because, while the outer layer 130 is a relatively hard glass having a softening point above that of the glass article 110, the outer layer 130 is substantially porous, and is affected by the acid because it is not fully sintered. For example, without being bound by theory, it is believed that if the outer layer 130 were fully sintered, the acid would not remove the outer layer 130 because of its hard composition. However, since the outer layer 130 is porous, the acid can remove the outer layer 130 even though it may have a composition regarded as harder than that of the composition of the glass article 110.

The shaped glass article 110 may subsequently undergo additional processing steps, such as ion-exchange processing, cutting, or undergo other mechanical or chemical manipulation.

It should now be understood that the methods described herein exhibit an improved process for producing shaped glass articles, whereby a glass article with a relatively high softening point may be shaped without substantially degrading the finish of the surface of the glass article which is closest to the mold. Additionally, the process does not cause sticking between the mold and the coatings applied to the glass article to maintain the finish of the surface of the glass article.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

EXAMPLES

The various embodiments of glass containers with low-friction coatings will be further clarified by the following examples. The examples are illustrative in nature, and should not be understood to limit the subject matter of the present disclosure.

Example 1

Figure 5:
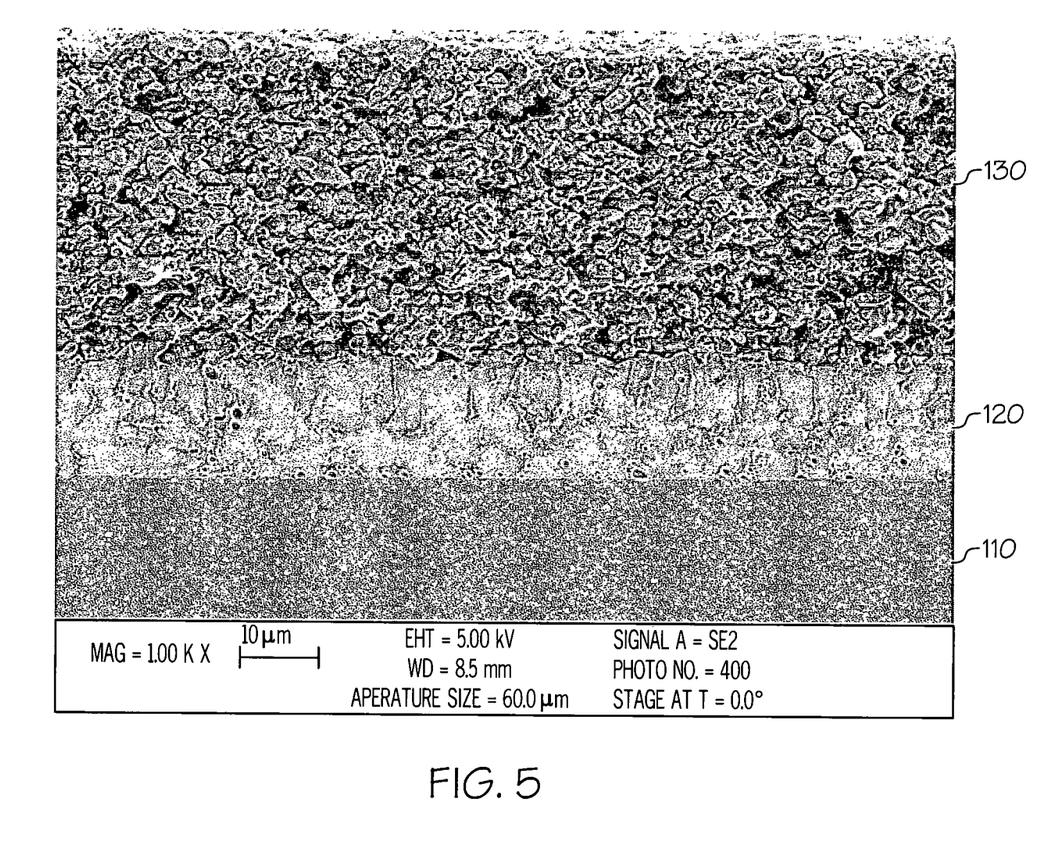
FIG. 5 shows a microscopic image of a cross-sectional view of a glass article with an inner layer and outer layer following shaping.

A sodalime glass substrate shaped as a flat sheet was coated with an inner layer of a paste formed from the organic binder MX54 and a soft glass having a composition of 4.1 wt % $SiO_2$, 47.5 wt % $B_2O_3$, 2.4 wt % $Al_2O_3$, 2.5 wt % $Li_2O$, and 43.5 wt % BaO. The inner layer was applied by doctor blade and had a thickness of about 30-35 microns after drying for about 1 hour at 100° C. An outer layer was deposited directly over the inner layer. The outer layer was a paste formed from equal weight of the organic binder MX54 and Corning GORILLA® GLASS (CODE 2318), a relatively hard glass. The outer layer was applied by doctor blade and had a thickness of about 30-50 microns after drying for about 1 hour at 100° C. The glass substrate was heated at about 830° C. during 1 minute and formed at between 600° C. to 720° C. while in contact with a mold for 12 seconds. FIG. 5 shows a microscopic view of the coated glass substrate (where reference no. 110 identifies the glass substrate, reference no. 120 identifies the inner layer, and reference no. 130 identifies the outer layer). As can be seen in the micrograph, the inner layer is substantially sintered while the outer layer remains porous. The inner layer has a reduced thickness due to the full sintering and liberation of the organic binder.

Example 2

Glass substrates were shaped according to the process and materials described in Example 1. The inner layer had a thickness of about 15 to 20 microns and the outer layer had a thickness of about 30-50 microns after molding. The inner and outer layers were contacted with 1M HCl by immersion. The inner and outer layer were dissolved in approximately 5 to 6 minutes. A sample was prepared with only an inner layer having a thickness of about 25-35 microns (no outer hard layer) and the layer was dissolved in approximately 2 minutes.

What is claimed is:

1. A method for producing a shaped glass article, the method comprising:
    heating at least a portion of a mold-facing surface of a glass article to a forming temperature, the glass article coated with a multi-layer removable coating comprising an inner layer in contact with the glass article and an outer layer disposed over the inner layer, the inner layer comprising a first glass having a viscosity from about $10^4$ P to about $10^{7.5}$ P at the forming temperature, the outer layer comprising a second glass having a viscosity from about $10^{7.8}$ P to about $10^{14}$ P at the forming temperature;
    shaping the glass article in a mold, wherein the mold is in direct contact with the outer layer during shaping; and
    removing the multi-layer coating from the glass article.

2. The method of claim 1, wherein the first glass of the inner layer comprises a softening point of at least about 50° C. less than softening point of the glass article.

3. The method of claim 1, wherein the second glass of the outer layer comprises a softening point about equal to or greater than softening point of the glass article.

4. The method of claim 1, wherein the removing step comprises contacting the multi-layer coating with an acid.

5. The method of claim 4, wherein the acid etches the inner layer and the outer layer but does not substantially etch the mold-facing surface of the glass article.

6. The method of claim 1, wherein prior to the shaping step, the glass article comprises a glass sheet, and subsequent to the shaping step, the glass article comprises a three-dimensional shape.

7. The method of claim 1, wherein:
    the inner layer comprises glass frit of the first glass and a binder material; and
    the outer layer comprises glass frit of the second glass and a binder material.

8. The method of claim 1, wherein the outer layer is porous following the shaping of the glass article.

9. The method of claim 1, wherein:
    the inner layer has a thickness from about 5 microns to about 150 microns; and
    the outer layer has a thickness from about 5 microns to about 150 microns.

10. The method of claim 1, wherein the glass article has a softening point of at least about 750° C.

11. The method of claim 1, wherein the softening point of the first glass of the inner layer is at least about 100° C. less than the softening point of the second glass of the outer layer.

12. A method for producing a shaped glass article, the method comprising:
    heating at least a portion of a mold-facing surface of a glass article to a forming temperature that is within about 100° C. of the softening point of the glass article, the glass article coated with a multi-layer removable coating comprising an inner layer in contact with the glass article and an outer layer disposed over the inner layer, the inner layer comprising a first glass having a softening point of at least about 50° C. less than a softening point of the glass article, the outer layer comprising a second glass having a softening point about equal to or greater than the softening point of the glass article;
    shaping the glass article in a mold, wherein the mold is in direct contact with the outer layer during shaping; and
    removing the multi-layer coating from the glass article.

13. The method of claim 12, wherein prior to the shaping step, the glass article comprises a glass sheet, and subsequent to the shaping step, the glass article comprises a three-dimensional shape.

14. The method of claim 12, wherein:
    the inner layer comprises glass frit of the first glass and a binder material; and
    the outer layer comprises glass frit of the second glass and a binder material.

15. A coated glass article comprising:
    a glass article comprising a first surface and a second surface opposite the first surface; and
    a multi-layer removable coating comprising an inner layer in contact with the first surface of the glass article and an outer layer disposed over the inner layer, the inner layer comprising a first glass having a softening point of at least about 50° C. less than a softening point of the glass article, the outer layer comprising a second glass having a softening point about equal to or greater than the softening point of the glass article.

16. The coated glass article of claim 15, wherein:
    the first glass of the inner layer has a viscosity from about $10^4$ P to about $10^{7.5}$ P at a forming temperature;
    the second glass of the outer layer has a viscosity from about $10^{10}$ P to about $10^{14}$ P at the forming temperature; and
    the forming temperature is within about 100° C. of the softening point of the glass article.

17. The coated glass article of claim 15, wherein:
    the inner layer comprises glass frit of the first glass and a binder material; and
    the outer layer comprises glass frit of the second glass and a binder material.

18. The coated glass article of claim 15, wherein the glass article comprises a glass sheet.

19. The coated glass article of claim 15, wherein the glass article comprises a three-dimensional shape.

20. The coated glass article of claim 15, wherein the outer layer is porous.

21. The method of claim 1, wherein the forming temperature is within about 100° C. of a softening point of the glass article.

22. The coated glass article of claim 15, wherein:
    the inner layer is substantially sintered; and
    the outer layer is not fully sintered.

* * * * *